Figure 1:
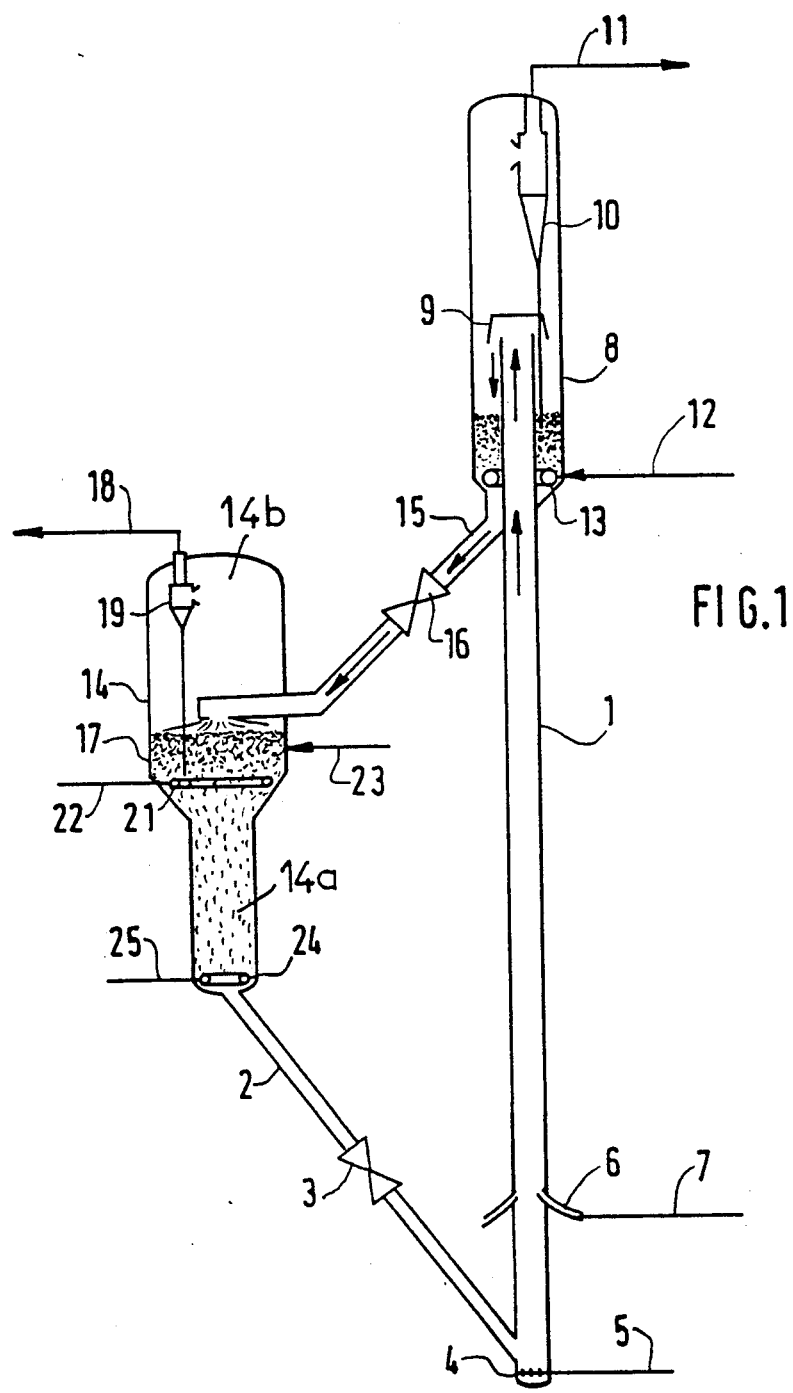

United States Patent [19]

Mauleon et al.

[11] Patent Number: 4,959,334
[45] Date of Patent: Sep. 25, 1990

[54] FLUIDIZED-BED CATALYST REGENERATION

[75] Inventors: Jean-Louis Mauleon, Marly-Le-Roy; Jean-Bernard Sigaud, Vaucresson, both of France

[73] Assignee: C. Compagnie De Raffinage Et De Distribution, Levallois-Perret, France

[21] Appl. No.: 287,500

[22] Filed: Dec. 21, 1988

[30] Foreign Application Priority Data

Dec. 21, 1987 [FR] France ................... 87 17822

[51] Int. Cl.⁵ .................. B01J 38/34; B01J 38/36; B01J 29/38; C10G 11/18
[52] U.S. Cl. .................... 502/43; 208/164; 422/144; 502/41; 502/42; 502/39
[58] Field of Search .............. 502/39, 41, 42, 43, 502/49; 208/164

[56] References Cited

U.S. PATENT DOCUMENTS

| 2,488,030 | 11/1949 | Scheineman | 502/41 |
| 2,985,584 | 5/1961 | Rabo et al. | 208/120 |
| 3,153,635 | 10/1964 | Bond | 252/432 |
| 3,909,392 | 9/1975 | Horecky, Jr. et al. | 208/120 |
| 3,963,603 | 6/1976 | Bunn, Jr. et al. | 208/164 |
| 4,013,546 | 3/1977 | Suggitt et al. | 208/164 |
| 4,214,978 | 7/1980 | Kennedy et al. | 502/42 |
| 4,388,218 | 6/1983 | Rowe | 502/43 |
| 4,818,372 | 4/1989 | Mauleon et al. | 208/113 |

FOREIGN PATENT DOCUMENTS

| 074501 | 3/1982 | European Pat. Off. . |
| 120096 | 10/1984 | European Pat. Off. . |
| 184517 | 6/1986 | European Pat. Off. . |
| 208609 | 1/1987 | European Pat. Off. . |
| 211340 | 2/1987 | European Pat. Off. . |
| 2089344 | 4/1971 | France . |

Primary Examiner—Paul E. Konopka
Attorney, Agent, or Firm—Curtis, Morris & Safford

[57] ABSTRACT

A process for the regeneration of a catalyst by combustion of the coke deposited thereon during a hydrocarbon conversion reaction in which process more than 50 percent of the coke is burned in at least one regeneration chamber operating with a fluidized bed, wherein the upper portion of the fluidized bed the suspension of catalyst particles in said chamber is slowed down due to a substantial increase in the diameter of the regeneration chamber so that the superficial velocity of the rising fluids which no longer contain any oxygen is reduced to a value ranging from 0.5 to 1.5 meters/second, that is, to a value corresponding to the fluidization conditions in a dense fluidized bed.

12 Claims, 3 Drawing Sheets

FLUIDIZED-BED CATALYST REGENERATION

The present invention relates to a process and an apparatus for the regeneration of a catalyst in a fluidized bed which permits the coke deposited on the catalyst during a hydrocarbon conversion reaction to be removed with a minimum quantity of oxygen. It relates in particular to the regeneration of catalytic cracking catalysts.

It is known that the petroleum industry routinely employs conversion processes in which hydrocarbon molecules with a high molecular weight and a high boiling point are broken down into smaller molecules which can be distilled in lower temperature ranges suitable for the intended use.

The process most commonly used at present for this purpose is the so-called Fluid Catalytic Cracking (FCC) process. In this type of process, the hydrocarbon feedstock is vaporized by being contacted at high temperature with a cracking catalyst that is kept in suspension by the vapors of the feedstock. After the desired range of molecular weights has been obtained by cracking, the catalyst is separated from the products obtained, stripped, reactivated by combustion of the coke formed during the reaction, and then again contacted with the feedstock to be cracked.

In processes of this type, the desired lowering of the boiling points is the result of controlled catalytic and thermal reactions, and the FCC process is, of course, carried out in such a way that the conversion section is in thermal equilibrium. In other words, the intake of hot regenerated catalyst should be such that it will be able to meet the diverse heat requirements of the reaction section, namely, in particular, the preheating of the liquid feedstock, the vaporization of that feedstock, the heat input required by the reactions involved, which overall are endothermic, and the heat losses of the system.

To attain the thermal equilibrium mentioned above as rapidly as possible, it is therefore important not only to inject the feedstock to be cracked finely atomized into the reaction zone at a temperature which may be as high as 400° C. but also to supply the necessary heat by injecting the regenerated catalyst at a higher temperature (which may range from 600° to 950° C.), the heat stored by the catalyst particles resulting from the combustion of the coke deposited thereon during the cracking reaction.

The stage of regeneration of the catalyst in a fluidized bed therefore is a very important stage in the cracking operation. However, it does pose very delicate problems of fluidization of the catalyst particles by means of the oxidizing fluid used to burn the coke, and these have not been completely resolved up to now.

As is known, there are several types of fluidized beds, which differ from one another by the nature of the fluids and particles involved and by the velocity of the fluids used. Thus there are dense fluidized beds, moving or ebullating beds, circulating dilute-phase fluidized beds, etc., the velocity of the rising fluid increasing progressively from one type to the next.

In conventional fluidized-bed regenerators, the combustion of the coke deposited on the catalyst is preferably carried out in a regeneration chamber operating with a dense fluidized type of bed in which the velocity of the rising oxygen-containing fluid generally ranges from 0.5 to 1.5 meters/second. A substantially homogeneous medium can thus be obtained in which the heat transfer between gases and solids is particularly rapid. At this point in time, two types of fluidized beds are known, apart from the complete-backmixing fluidized beds: Cocurrent fluidized beds and countercurrent fluidized beds. Countercurrent fluidized beds, in which the catalyst containing coke is introduced into the upper portion of the bed and the at least partially regenerated catalyst is withdrawn from the bottom of the bed, are in particularly wide use since there the catalyst particles encounter in the course of their advance a fluid that becomes progressively richer in oxygen, which in principle assures the complete combustion of all of the coke carried by them while hot spots that might deactivate the catalyst are minimized.

In practice, however, this combustion poses serious problems. In fact, it is not possible, at least when only one combustion chamber is employed, to effect the regeneration at a temperature above 750° C., and preferably 720° C., without damaging the catalyst at least partially because of the presence in the reaction medium of water vapor resulting, on the one hand, from the stripping operation which precedes the combustion or from the moisture introduced with the oxidizing air and, on the other hand, from the combustion of heavy hydrocarbons deposited on the catalyst surface during the cracking reaction.

Now the combustion of carbon to carbon dioxide is very exothermic, and the regeneration becomes very difficult to carry out when the quantity of coke deposited on the catalyst is substantial. To overcome this difficulty, it has long been proposed (see in this connection U. S. Pat. Nos. 2,985,584, 3,909,392 and 4,013,546) to favor the combustion of the solid coke to gaseous carbon monoxide (CO) as much as possible since that reaction is much less exothermic, and then to burn the carbon monoxide by routing the gaseous effluents from the combustion to a separate chamber for recovery of the heat of combustion of the carbon monoxide to carbon dioxide. However, the judicious combustion of the coke also has its limits:

On the one hand, if the formation of CO is favored by limiting the quantity of oxygen-containing fluid injected at the base of the fluidized bed, it is hardly possible to burn more than 50 to 70 percent of the coke deposited on the catalyst, which is not enough to restore the catalyst to its initial activity even when several stages of combustion are employed.

On the other hand, if the quantity of oxygen-containing fluid injected at the base of the fluidized bed is increased, the oxygen is sufficiently concentrated for the conversion to $CO_2$ of the CO entrained in the rising gas phase to compete with the oxidation of the coke to CO. Since that conversion is highly exothermic, it results not only in high oxygen consumption but also in an excessively high temperature of the catalyst that will lead to its permanent and rapid deactivation and will often exceed the temperature limits of the surrounding metal components.

Finally, if the flow rate of the oxygen-containing fluid is increased still further, the fluidized bed becomes a cocurrent fluidized bed or a circulating bed and the advantages of countercurrent combustion are lost.

The present invention seeks to remedy these various drawbacks through a judicious choice of fluidization conditions.

The present invention thus has as one embodiment a process for the regeneration of a catalyst by combustion of the coke deposited thereon during a hydrocarbon conversion reaction in which process more than 50 percent of the coke is burned in at least one regeneration chamber operating with a fluidized bed, said process being characterized in that the combustion of the coke is carried out at a temperature which does not exceed 750° C., and preferably 720° C., in a fluidized bed in which the catalyst particles circulate essentially from top to bottom countercurrent to an oxygen-containing fluid whose rising superficial velocity at the base of the fluidized bed ranges from 1.2 to 3.5 meters/second so as to maintain in the effluent gases from said chamber a $CO/CO_2$ ratio of from 0.5 to 1.5, the at least partially regenerated catalyst particles being recovered preferably at the base of the fluidized bed, and that the suspension of catalyst particles is slowed down in the upper portion of the fluidized bed due to a substantial increase in the diameter of the regeneration chamber so that the superficial velocity of the rising fluids which no longer contain any oxygen is reduced to a value between 0.5 and 1.5 meters/second, that is, to a value corresponding to the conditions of fluidization in a dense fluidized bed.

Thus, the configuration of the fluidized bed in accordance with the present invention makes it possible to maintain a fluid velocity in the bottom portion of the bed that permits very rapid axial diffusion of the oxygen toward the deposited coke and minimizes the oxidation of the carbon monoxide, despite the unfavorable, much faster reaction kinetics of the carbon monoxide to carbon dioxide, due to the high velocity with which the monoxide formed is entrained toward the upper portion of the bed, which is completely depleted of oxygen. The increase in diameter of the fluidized bed in its upper portion, which no longer contains any oxygen, thus makes it possible to reduce the velocity of the rising fluid per unit area and to there maintain conditions of a dense, completely countercurrent type of fluidized bed.

A first advantage of the present invention stems from the presence in the upper portion of the fluidized bed of a dense zone that is fluidized by the effluents from the combustion zone which no longer contain any oxygen. These effluents, whose temperature is of the order of from 700° to 720° C., there bring about on the one hand the preheating of the catalyst particles coming from the stripping zone, whose overall motion is countercurrent, and, on the other hand, a supplementary stripping permitting the removal of the water vapor as well as of the hydrocarbons, relatively rich in oxygen, which have been entrained with the catalyst or absorbed in its pores. This advantage is enhanced when the catalyst particles coming from the actual stripping zone are dispersed uniformly, and in a manner which is known per se, over the entire section of the chamber located above the surface of the dense fluidized bed. The result of this supplementary stripping is that— on the one hand, the quantity of carbon which remains to be burned on the catalyst is considerably reduced and is less rich in hydrogen;

on the other hand, the water vapor coming from the stripping zone and entrained with the effluents no longer poses a hazard of damage to the catalyst, brought to a high temperature during the combustion of the coke, which can easily occur especially when the catalyst is contaminated with alkali metals or heavy metals; and finally, the energy of combustion of the hydrocarbons so stripped and of the carbon monoxide contained in the rising gaseous effluents may be recovered in its entirety in a zone provided specifically for this purpose downstream of the regeneration chamber and therefore is not absorbed by the catalyst.

Another advantage of the process of the invention is due to the fact that heat transfer there is optimized within the dense fluidized bed. The combustion temperature can thus be regulated by the optional reinjection of regenerated catalyst after the latter has been cooled, if necessary, by being passed through a heat exchanger. Due to the presence of the dense fluidized phase, temperature homogeneity is established almost instantaneously and the resulting lowering of the temperature can be compensated advantageously by increasing the oxygen flow rate, which further promotes the combustion of the coke in the lower portion of the fluidized bed.

A further advantage of the process arises from the fact that the dense fluidized bed no longer contains any oxygen in the upper portion of the regeneration zone. Reducing conditions may therefore be established there by injection of a limited quantity of steam. A portion of the coke deposited on the catalyst will then be capable of reacting endothermically, in the absence of oxygen, with this steam to produce carbon monoxide and hydrogen, which will then be entrained with the rising fluid. Moreover, since this reaction is endothermic, the proportioning of the quantity of water and of steam injected will also permit the temperature of the combustion zone in the lower portion of the fluidized bed to be regulated.

Still another advantage of the process of the present invention may be obtained either by injecting into the combustion zone, into the feedstock or into the various recycles to the reaction zone, or by depositing on the catalyst before it is placed into service, promoters for the oxidation of the carbon to carbon monoxide (such as, in particular, cerium compounds) to improve, in a manner which is known per se, the kinetics of that combustion to the detriment of the formation of carbon dioxide resulting from the oxidation of the CO. Among the combustion promoters (see, in this connection, U. S. Pat. No. 3,153,635 and European patent Nos. 120,096 and 211,340) are, for example, kaolin and the derivatives of cerium, magnesium, chromium and phosphorus. In line with a similar approach, additives of a type known per se that will retard the oxidation of CO to $CO_2$, such as, in particular, the chlorides of magnesium or phosphorus, may also be used.

Finally, a particularly worthwhile advantage of the process of the invention may be secured by employing downstream of the first regeneration chamber described above a second chamber operating at a higher temperature. This type of regeneration with two combustion chambers, both preferably equipped with their own discharge means for the gaseous effluents, is particularly well suited for units for the conversion of heavy hydrocarbon feedstocks, that is, feedstocks containing sizable proportions of hydrocarbons with high boiling points, such as those containing resins, asphaltenes or polyaromatic compounds and having high Conradson carbon and metal contents. (See, in this connection U.S. Pat. No. 4,818,372 or its equivalent published European patent application No. 208,609, filed by the Applicant's Assignee.) It is known, in fact, that good vaporization of these feedstocks requires that prior to their catalytic cracking their temperature in the injection zone of the reactor be raised to values which may range from 500° to 700° C. Under these conditions, and taking into account the quantity ratio of catalyst to feedstock (commonly called the C/0 ratio), the desirable temperature of the regenerated catalyst will be in the approximate range from 700° to 950° C. However, in order that the catalyst may have a satisfactory service life, it is advisable to bring the regenerated catalyst to such temperatures only for as short a time as possible and in a relatively dry atmosphere.

The use of a regeneration apparatus in accordance with the present invention will be appropriate particularly for the regeneration of cracking catalysts for heavy feedstocks insofar as it permits the combustion in the first chamber of the major portion of the coke, for example, from 50 to 90 percent of the coke initially deposited during the reaction, and the transfer to a second chamber, operating with an excess of oxygen and at an unlimited temperature (since there is no longer any water vapor that might damage the catalyst), of the catalyst containing the residual coke, which will be burned completely to produce $CO_2$. The temperature resulting from the thermal equilibrium which will be established will generally be higher and close to the desired level for the cracking of the heaviest feedstocks.

Since the quantity of residual coke on the catalyst routed to the second regeneration chamber is thus limited to that strictly necessary, it becomes possible to carry out in the second regeneration chamber, in a manner which is known per se, a combustion in a cocurrent or countercurrent fluidized bed during which the residence time of the catalyst at temperatures ranging from 750° to 950° C. will be limited to the very minimum necessary for complete regeneration.

The invention thus has as a further embodiment an apparatus for the regeneration of a catalyst by combustion of the coke deposited thereon during a hydrocarbon conversion reaction, said apparatus comprising:

At least one chamber for combustion of the coke in which the catalyst is maintained in a fluidized bed by means of a gaseous fluid;

in the lower part of the chamber, feeding means for said gaseous fluid in admixture with oxygen;

in the upper part of the chamber, means for the discharge of the gaseous effluents;

at a level intermediate between the discharge means for the gaseous effluents and the upper level of the suspension of the catalyst in a fluidized bed, means for supplying the chamber with spent catalyst to be regenerated; and at the bottom of the chamber, and preferably below the feeding means for an oxygen-containing fluid, means for the discharge of the at least partially regenerated catalyst, said apparatus being characterized in that the oxidizing-gas feed rate exceeds 3,500 $m^3/h \times m^2$ in the bottom portion of the fluidized bed, and that the upper part of the combustion chamber comprises a section whose diameter is from 1.25 to 3.0 times that of the bottom part of the chamber without appreciable makeup of gaseous fluid.

The ebullating fluidized bed so produced at the base of the combustion zone in accordance with the present invention should be of sufficient height to permit the complete combustion of the desired quantity of carbon deposited on the catalyst particles, allowing for the quantity of oxidizing fluid injected. However, that height should be calculated to minimize the residence time of the carbon monoxide produced, and hence its oxidation with any oxygen present. The residence time is generally held to less than 5 seconds, and preferably to less than from 2 to 3 seconds.

The upper portion of the fluidized bed, in which the fluidizing gases will be depleted of the oxygen which they contained, thus is formed by a dense fluidized bed as a result of the increase in the diameter of the chamber in a ratio of from 1.25 to 3.0 times the diameter of the subjacent zone, while the quantity of the rising fluids remains unchanged overall. This dense fluidized phase, in which the superficial velocity of the gaseous fluids decreases to about 0.2 to 1.5 meters/second, and preferably to 0.5 to 1.2 meters/second, thus assures a rapid uniformization of the temperature of the catalyst particles located in that zone. Maintaining the temperature of this phase as close as possible to a desired temperature may be achieved advantageously in two distinct manners:

By introducing into that zone a variable quantity of at least partially regenerated catalyst, after passing it through a conventional type of heat exchanger, or by introducing into that zone, depleted of oxygen, a quantity of water or steam sufficient to permit the thermal decomposition of a portion of the coke while abstracting heat from the system. The water or steam is advantageously injected by means of a diffuser in the form of a large-diameter tubular ring located at the periphery of the bed. The quantity of water or steam so injected may range from 2 to 25 grams per kilogram of catalyst in circulation, for example.

The catalysts which can be treated in the apparatus which is the object of the present invention include all conversion catalysts on which coke deposits during a reaction. They include, in particular, all cracking catalysts, among them those of the crystalline silicoaluminate type and certain types of aluminosilicate, magnesium silicate and zirconium silicate catalysts, all of which have relatively high cracking activity. The crystalline silicoaluminates may be in the natural state or may have been prepared synthetically by techniques well known to those skilled in the art. They may be selected from among the synthetic zeolites or the clays, for example, faujasite, certain mordenites, erionites or offretites, montmorillonite, the bridged clays, the aluminophosphates or the like.

Figure 2:
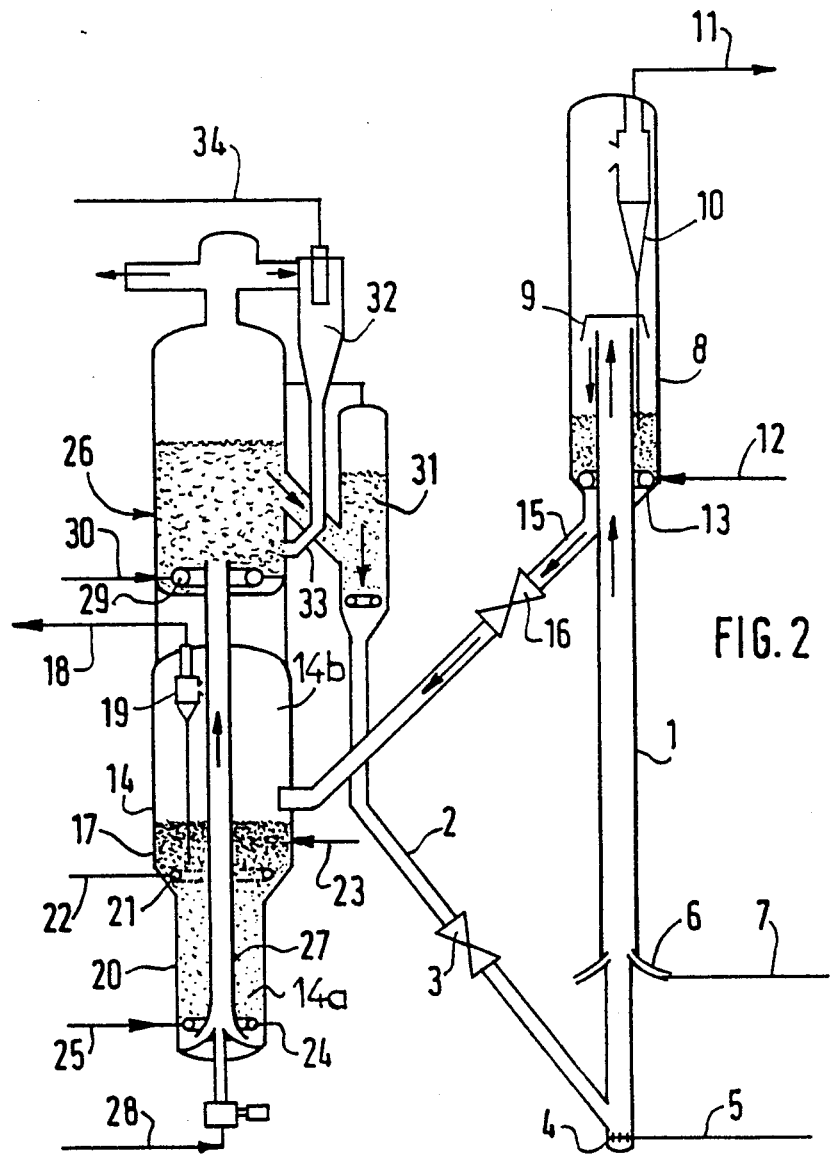
Figure 3:
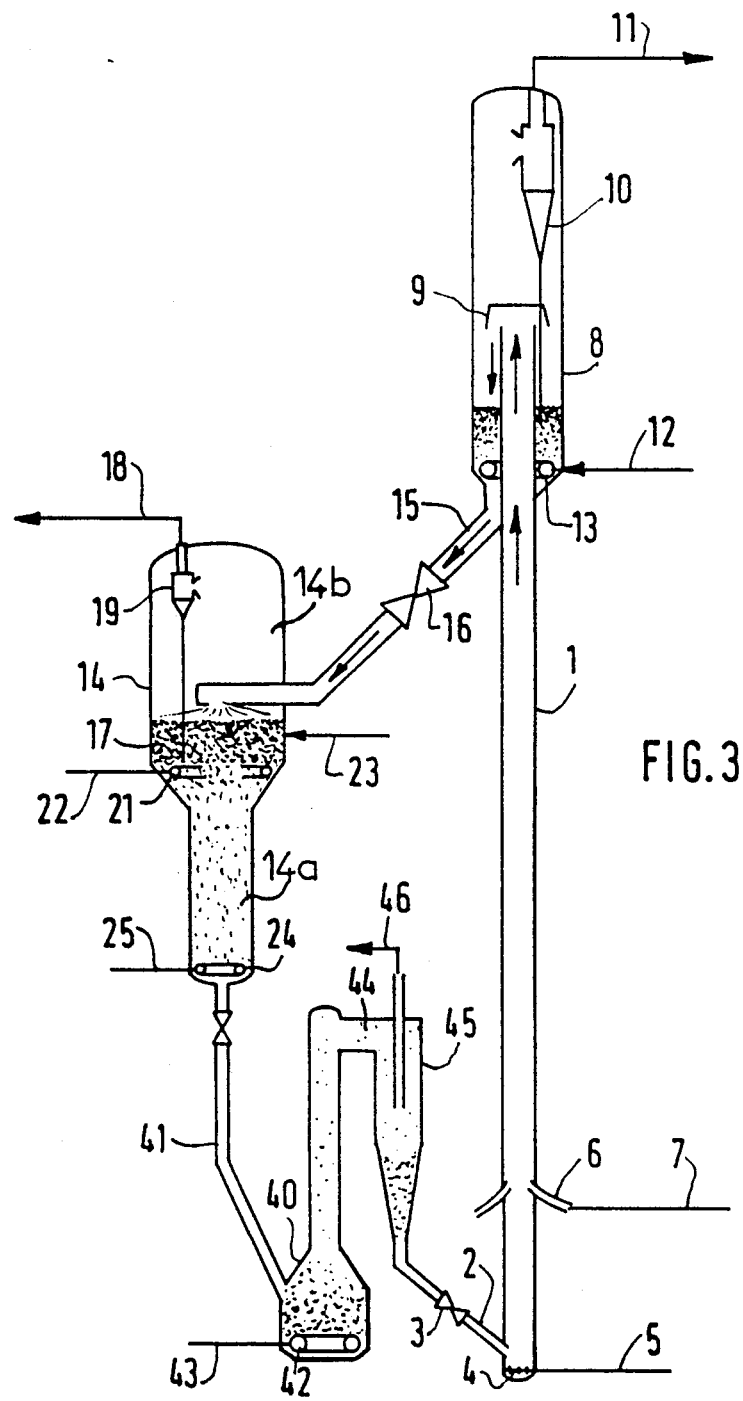

The accompanying diagrammatic drawings illustrate one embodiment of the present invention. However, they are not limitative. In these drawings, FIG. 1 is a diagram of a fluidized-bed catalytic cracking unit equipped with a regeneration apparatus in accordance with the invention;

FIG. 2 is a diagram of a similar unit comprising a regeneration apparatus with two combustion chambers; and FIG. 3 shows a unit similar to that of FIG. 2 but equipped with a variation of the regenerator with two combustion chambers.

The conversion unit illustrated in FIG. 1 and equipped with a regeneration unit according to the invention is a fluidized-bed catalytic cracking unit, also known as a Fluid Catalytic Cracking (FCC) unit, operating with a single regeneration chamber.

It essentially comprises a column 1, known as a riser, which at its base is supplied through a line 2 with regenerated catalyst particles in a quantity determined by the opening or closing of a valve 3.

The catalyst is propelled in the riser in a homogeneous dilute phase by the injection of steam (or of a light hydrocarbon) through a diffuser 4, supplied through a line 5. The diffuser is located in the riser below the regenerated-catalyst supply line.

The feedstock to be cracked is introduced at a higher level of the riser by means of an injector 6, supplied through a line 7.

The column 1 empties at its top into a vessel 8 which is concentric with it, for example, and in which on the one hand the gaseous effluents and the catalyst are separated by means of a ballistic separator 9 and, on the other hand, the spent catalyst is stripped. The reaction products are freed from all catalyst in a cyclone system 10, which here is accommodated in the vessel 8 and at the top of which a discharge line 11 for the effluents is provided while the spent catalyst particles are reinjected at the bottom of the vessel 8. A line 12 supplies a stripping gas, usually steam, to a diffuser 13, located at the bottom of the vessel 8.

The spent catalyst particles so stripped are discharged at the bottom of the vessel 8 to a regenerator 14 through a pipe 15 which is provided with a control valve 16.

The regenerator 14 comprises two superposed cylindrical sections, 14a and 14b, the top section 14b having a larger diameter than the bottom section 14a. An oxidizing gaseous fluid is fed through a line 25 to a diffuser 24 located at the bottom of section 14a of the regenerator 14 and maintains the catalyst in suspension while it is being regenerated. As pointed out above, as a result of the difference in the diameters of sections 14a and 14b, an ebullating catalyst bed is obtained in the bottom section 14a, and a dense fluidized bed in the top section 14b.

In section 14b of the regenerator 14, the spent catalyst particles are dispersed above the surface of the dense fluidized bed 17 so that the fluids rising from that bed permit the rapid desorption at a high temperature of the water vapor and hydrocarbons still present on the catalyst, which are discharged through a line 18 after passing through a cyclone 19.

In zone 17, where the fluidizing gases no longer contain any oxygen, the spent catalyst particles form a dense fluidized bed (due to the low flow rate per unit area), and the catalyst particles continue to be heated there and stripped by the hot rising fluid containing considerable quantities of carbon monoxide.

It is thus possible to utilize the properties of this upper portion of the fluidized bed to inject therein water or steam through a diffuser 21, supplied through a line 22, for the purpose of converting a portion of the coke to carbon monoxide while removing heat from zone 17 as this reaction is endothermic.

It is also possible to inject through a line 23 regenerated catalyst, withdrawn through the line 2 and cooled in a conventional heat exchanger, which is not shown in the figure. Regulation of the flow rate of the oxidizing gas in line 25 on the basis of the temperature prevailing in zone 17 will then permit the combustion temperature to be set below a threshold of 750° C., and preferably of 720° C.

The regenerated catalyst is withdrawn through line 2 from the bottom of the fluidized bed 14a so that the coked catalyst particles move downward toward the bottom of the regenerator, where they encounter a strong current of oxidizing fluid which contains the more oxygen the closer the particles get to the diffuser 24, supplied through line 25. Under these conditions, maximum combustion of the coke is assured, and the height of zone 14a, where the oxidizing fluid rises with a velocity which preferably ranges from 1.25 to 2.5 meters/second, is adjusted as required to provide for the combustion of all or part of the coke.

FIG. 2 shows a variation of an FCC unit in which the regeneration apparatus comprises two chambers for regeneration of the spent catalyst, which makes it possible to supply, upon the injection of hydrocarbon feedstocks, a catalyst at a higher temperature intended in particular for the treatment of heavy feedstocks. In FIG. 2, the components described in connection with FIG. 1 are designated by the same reference numerals.

The spent catalyst which has undergone stripping in the vessel 8 is sent through a pipe 15 to a first combustion chamber 14, of the same type as that described in connection with FIG. 1, in which a proportion of from 50 to 90 percent of the coke can be burned according to the present invention.

The catalyst particles which have been subjected to a first regenerating treatment are transferred to a second stage 26 of the regenerator through a central pipe 27, which at its base is supplied with air through a line 28.

The bottom of the second stage 26 may also be supplied with air through a diffuser 29, fed through a line 30, which permits this second fluidized-bed regeneration chamber to be operated with a slight excess of oxygen, and, consequently, the temperature of combustion, and hence the temperature of the regenerated catalyst, to rise freely. The regenerated catalyst particles are discharged laterally to a buffer vessel 31 and recycled through the feed pipe of the riser 1. The flue gases discharged at the top of the chamber 26 are treated in an external cyclone 32, at the bottom of which the catalyst particles are returned to chamber 26 through a pipe 33 while the flue gases are discharged through a line 34.

This embodiment of the apparatus according to the invention, equipped with two upward-flow regeneration chambers, offers the following advantages:

It provides for double regeneration of the catalyst, permitting complete combustion of the coke deposited on the catalyst without appreciable alteration of its catalytic or physical properties; and it imposes no limit on the temperature in the second regenerator, permitting the catalyst to be brought to the temperature required for the vaporization and cracking of heavy feedstocks in particular.

FIG. 3 shows a fluidized-bed catalytic cracking unit equipped with a variation of a regenerator with two combustion chambers in which the second chamber operates with a circulating bed, in contrast to that of the apparatus illustrated in FIG. 2.

In fact, the use of this configuration is particularly worthwhile within the scope of the invention insofar as the combustion which proceeds for the most part cocurrently in the fluidized phase assures good transfer of the heat of combustion to the catalyst particles while holding the residence time of the catalyst to less than two minutes, as against an average of from 3 to 15 minutes in the case of the second chamber, operating countercurrently, shown in FIG. 2.

In FIG. 3, the components already described in connection with FIG. 1 are again designated by the same reference numerals.

The spent catalyst which has already undergone stripping in the vessel 8 is sent through the pipe 15 to a first combustion chamber 14, in which a proportion of from 50 to 90 percent of the coke can be burned in accordance with the present invention. The catalyst particles which have been subjected to a first regenerating treatment are here transferred by gravity, through a pipe 41, to a second stage 40 of the regenerator, at the base of which there is disposed a diffuser 42 to which air is supplied through a line 43.

Fluidized-bed operating conditions are provided for at the bottom of zone 40 and are sufficient to permit the homogenization of a certain quantity of catalyst particles in a very short time as well as the start of combustion. However, they are limited to prevent excessive backmixing of the catalyst particles. In practice, the average residence time in this zone will be less than two minutes, and preferably less than one minute.

An acceleration of the fluidizing gases of this second chamber is then brought about through a contraction of the cross section of the regeneration zone. The fluidization velocity then becomes sufficiently high to bring about entrained-bed operation. In the course of the combustion resulting therefrom, the temperature of the particles gradually increases and may reach about 950° C.

The fluidizing gases which mix with the flue gases from the combustion are discharged with the entrained particles at the top of chamber 40 through a pipe 44 which opens into a separator 45. The latter consists of a cyclone which comprises an axial stack permitting the discharge of the scrubbed gases to a flue duct 46 and whose hopper-shaped bottom discharges through a bottom outlet into pipe 2 which feeds regenerated catalyst to the reactor 1. In practice, the average residence time of the catalyst at a temperature above 775° C. will be less than 30 seconds, and preferably less than 10 seconds.

The example which follows illustrates the advantages of the invention.

EXAMPLE

To a catalytic cracking unit comprising a conventional cracking column and a catalyst regeneration system of the type shown in FIG. 2 there is sent a heavy feedstock, which here is a reduced crude (that is, a direct atmospheric distillation residue). A commercial catalyst is used which comprises ultrastabilized zeolites and a matrix suitable for cracking the heaviest hydrocarbon molecules under cracking conditions.

Two tests are run with the same feedstock, one under the usual cracking and regeneration conditions (test A) and the other (test B) by using a regenerator of the same type but modified in accordance with the characteristics of the present invention.

A comparison of the operating conditions of the first regeneration chamber permits the following comparative table to be presented.

TABLE

|  | Test A | Test B |
| --- | --- | --- |
| Ratio of diameters between upper and lower portions of fluidized bed | 1.2 | 1.7 |
| Residual hydrogen content of coke in combustion zone, percent | 6.5 | 5.0 |
| Flow rate of injected air, kg/kg of coke | 11.7 to 12.2 | 9.7 to 10.3 |
| CO/CO$_2$ ratio of effluents | 0.25 to 0.40 | 0.9 to 1.4 |
| Temperature of upper portion of fluidized bed, °C. | 680 to 715 | 700 to 715 |
| Heat of combustion of coke, kcal | 7790 to 8240 | 5890 to 6480 |
| Percent of coke burned | 40 to 60 | 70 to 90 |

It is apparent from this example that in the usual process the percentage of coke burned at the temperature stated (limited to a maximum of 715° C.) is considerably below that obtained by the process of the invention. Moreover, the high CO contents of the effluent gases obtained in test B assure optimum recovery of the heat of combustion of this CO downstream of the regenerator by means known in the art.

It has been found, moreover, that an injection of from 0.01 to 0.10 kg of steam per kg of coke into the upper portion of the fluidized bed makes it possible on the one hand to reduce the coke content in the combustion zone and, on the other hand, to increase the air feed rate (and hence the rate of combustion of the coke) to compensate for the loss of heat resulting from the the reaction of this steam with the coke.

Finally, the holdup of catalyst brought to a high temperature (here of the order of from 800° to 825° C.) of the second regeneration chamber is reduced by more than 70 percent. The result is an increase in the life of the catalyst, and consequently in its activity.

We claim:

1. A process for the regeneration of catalyst particles by combustion of coke deposited thereon during a hydrocarbon conversion reaction to which process more than 50 percent of the coke is burned in at least one regeneration chamber operating with a fluidized bed of said particles, said process comprising carrying out the combustion of the coke at a temperature which does not exceed 750° C. in a fluidized bed having an upper dense portion and a lower ebullating portion, in which the spent catalyst coming from the hydrocarbon conversion reaction is dispersed above the surface or in the upper part of the upper dense portion and the catalyst particles move essentially from top to bottom countercurrent to an oxygen-containing gas which functions as a fluidizing medium whose rising superficial velocity in the ebullating lower portion at the base of the fluidized bed ranges from 1.2 to 3.5 meters/second to maintain in the effluent gases from said chamber a CO/CO$_2$ ratio of from 0.5 to 1.5, recovering the at least partially regenerated catalyst particles from the lower portion of the fluidized bed and slowing down the fluidizing medium in the suspension of catalyst particles now essentially devoid of available oxygen in the resulting upper dense portion of the fluidized bed by substantially increasing the diameter of the zone of the regeneration chamber defining the upper dense portion so that the superficial velocity of the rising fluidizing medium which no longer contains any oxygen is reduced to a value between 0.2 and 1.5 meters/second which corresponds to the conditions needed for maintaining fluidization in a dense fluidized bed and wherein the ratio of diameters between an upper portion and a lower portion of the fluidized bed ranges from 1.25 to 3.00.

2. The process as defined in claim 1, wherein the combustion of the coke is carried out at a temperature which does not exceed 720° C.

3. The process as defined in claim 1, wherein the spent catalyst coming from the hydrocarbon conversion reaction is uniformly dispersed above the surface or in the upper portion of the fluidized bed which no longer contains any oxygen.

4. The process as defined in claim 1, wherein the contact times of the gases of the fluidizing medium and the catalyst in the fluidized bed is less than five seconds.

5. The process as defined in claim 1, wherein the superficial velocity of gaseous fluids in an upper portion of the fluidized bed which no longer contains any oxygen is of the order of from 0.2 to 1.5 meters/seconds.

6. The process as defined in claim 1, wherein the superficial velocity of gaseous fluids in an upper portion of the fluidized bed which no longer contains any oxygen is of the order of from 0.5 to 1.2 meters/seconds.

7. The process as defined in claim 1, wherein the combustion of the carbon to carbon monoxide is accelerated by the presence of a combustion accelerator.

8. The process as defined in claim 1, wherein the combustion of the carbon monoxide to carbon dioxide is inhibited by the presence of a carbon monoxide oxidation retarder.

9. The process as defined in claim 1, wherein a portion of coke on the catalyst is converted to carbon monoxide in the upper portion of the fluidized bed by a reaction with water obtained by the injection of water or steam into that zone.

10. The process as defined in claim 9, wherein the injection of water or steam and the resulting reaction is such that the catalyst is cooled.

11. The process as defined in claim 1, wherein the temperature prevailing in the combustion chamber is stabilized at a level below a limiting temperature of 750° C. by injecting regenerated catalyst, which has been cooled by passing through a heat exchanger, into an upper portion of the fluidized bed.

12. The process as defined in claim 1, wherein from 50 to 90 percent of the coke deposited during the conversion reaction is burned in a first regeneration chamber, and the remaining coke is burned in a second fluidized-bed regeneration chamber in the presence of an excess of oxygen so that the combustion to carbon dioxide results in the liberation of sufficient heat to yield a catalyst completely regenerated at a substantially higher temperature which ranges from 720° to 900° C.

* * * * *